United States Patent
Connett et al.

(10) Patent No.: US 7,086,673 B2
(45) Date of Patent: Aug. 8, 2006

(54) ROTATING FRONT BUMPER

(75) Inventors: Jerry J. Connett, Fort Wayne, IN (US); Lawrence A. Hoffman, Hoagland, IN (US); Gordon S. Johnson, Fort Wayne, IN (US); Matthew M. Sullivan, St. Joe, IN (US); Travis E. Dennison, Fort Wayne, IN (US); Patrick O. Gotschall, Fort Wayne, IN (US); Steven P. Kuhn, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 35 days.

(21) Appl. No.: 10/985,605

(22) Filed: Nov. 10, 2004

(65) Prior Publication Data

US 2006/0097526 A1    May 11, 2006

(51) Int. Cl.
*B60R 19/24* (2006.01)
(52) U.S. Cl. ..................... 293/118; 293/155
(58) Field of Classification Search ................ 293/17, 293/34, 118, 155
See application file for complete search history.

(56) References Cited

U.S. PATENT DOCUMENTS

| | | | | |
|---|---|---|---|---|
| 1,468,940 A | * | 9/1923 | Fleishman | 293/34 |
| 1,866,752 A | * | 7/1932 | Clifford | 293/17 |
| 2,639,933 A | * | 5/1953 | Meyer et al. | 293/118 |
| 2,789,855 A | * | 4/1957 | Buck | 293/118 |
| 4,582,351 A | * | 4/1986 | Edwards | 293/118 |
| 6,394,512 B1 | * | 5/2002 | Schuster et al. | 293/15 |
| 6,454,035 B1 | * | 9/2002 | Waskow et al. | 180/89.17 |

FOREIGN PATENT DOCUMENTS

| | | | | |
|---|---|---|---|---|
| FR | 1334552 | * | 6/1962 | 293/118 |
| JP | 0253247 | * | 11/1986 | 293/118 |

* cited by examiner

*Primary Examiner*—Dennis H. Pedder
(74) *Attorney, Agent, or Firm*—Jeffrey P. Calfa; Dennis K. Sullivan; Susan L. Lukasik

(57) ABSTRACT

A front bumper for a mobile vehicle that rotates to provide additional access to the vehicle engine. The rotating front bumper is provided in various embodiments, exemplifying possible modes of configuration and operation thereof. Specifically, methods of retaining the front bumper in a non-rotated position are presented, as are methods for preventing over-extension, and linkages that cause the front bumper to rotate when the hood is opened.

8 Claims, 9 Drawing Sheets

VEHICLE WITH CHASSIS, CAB, HOOD, AND BUMPER; BUMPER SHOWN IN ARTICULATED POSITION

VEHICLE WITH CHASSIS, CAB, HOOD, AND BUMPER; BUMPER ARTICULATED BY OVER-THE-CENTER TYPE FOUR-BAR LINKAGE; HOOD OPEN, BUMPER ROTATED

FIG. 1
VEHICLE WITH CHASSIS, CAB, HOOD, AND BUMPER

FIG. 2
VEHICLE WITH CHASSIS, CAB, HOOD, AND BUMPER; BUMPER SHOWN IN ARTICULATED POSITION

FIG. 3
VEHICLE WITH CHASSIS, CAB, HOOD, AND BUMPER; BUMPER SHOWN RETAINED BY CLEVISES AND PINS

FIG. 4
VEHICLE WITH CHASSIS, CAB, HOOD, AND
BUMPER; BUMPER SHOWN RETAINED
BY ELASTIC BUMPER LATCHING DEVICES

FIG. 5

VEHICLE WITH CHASSIS, CAB, HOOD, AND BUMPER; BUMPER ARTICULATED BY SLIDING FOUR-BAR LINKAGE; HOOD FULLY CLOSED, BUMPER IN NON-ROTATED POSITION

FIG. 6
VEHICLE WITH CHASSIS, CAB, HOOD, AND BUMPER; BUMPER ARTICULATED BY SLIDING FOUR-BAR LINKAGE; HOOD PARTIALLY OPEN, BUMPER IN NON-ROTATED POSITION

FIG. 7
VEHICLE WITH CHASSIS, CAB, HOOD, AND
BUMPER; BUMPER ARTICULATED BY
SLIDING FOUR-BAR LINKAGE;
HOOD AND BUMPER FULLY OPEN

FIG. 8
VEHICLE WITH CHASSIS, CAB, HOOD,
AND BUMPER; BUMPER ARTICULATED BY
OVER-THE-CENTER TYPE FOUR-BAR
LINKAGE; HOOD OPEN, BUMPER ROTATED

FIG. 9
VEHICLE WITH CHASSIS, CAB, HOOD,
AND BUMPER; BUMPER ARTICULATED BY
OVER-THE-CENTER TYPE FOUR-BAR
LINKAGE; HOOD CLOSED, BUMPER
IN NON-ROTATED POSITION

ROTATING FRONT BUMPER

BACKGROUND OF INVENTION

This invention relates to a rotating front bumper that provides easy access to the engine compartment of a mobile commercial vehicle. Specifically, multiple embodiments are disclosed, by means of which the vehicle front bumper, which ordinarily prevents access to the engine compartment, may be rotated forward. In this way, the rearwardly swept ends of the front bumper are moved out of the way.

SUMMARY

Mobile vehicles, especially heavy and medium-duty commercial vehicles, are commonly configured with the engine located longitudinally forward of the cab and mounted to a set of frame rails, which form the structure of the vehicle. Due to the overall size of these commercial vehicles, access to the engine and associated mechanical systems is provided by means of a forward tilting hood. This is in contrast to a passenger vehicle hood that lifts up from the front and provides access from the top of the engine compartment. This tilting hood allows a technician to service the vehicle engine from a standing position.

Additionally, these heavy and medium-duty commercial vehicles are provided with a front bumper, located forward and below the tilting hood. For reasons of aerodynamics, aesthetics, and safety, this front bumper commonly has ends that wrap around the front corners of the vehicle, so that they extend rearwardly before terminating. A front bumper with the characteristic of rearwardly extending termini is known as a "wrap-around" or "swept" front bumper. Occasionally, the front bumper is integrated into the forward tilting hood, but more often it is fixedly mounted to the vehicle frame rails.

In the case of previous fixedly attached wrap-around front bumpers, the rearwardly extending termini of the front bumper presented a barrier to a technician attempting to access the engine compartment. This forced the technician to climb over the end of the front bumper, or to squeeze between it and the vehicle front tire. The proximity of the rearwardly extending terminus of the front bumper also prevented rapid egress from a standing position between the vehicle front tire and the engine compartment, a position often occupied by a technician when servicing the vehicle engine. It sometimes even presented a barrier to a technician attempting to access the underside of the engine compartment using a mechanic's creeper.

In the case of previous wrap-around front bumpers that were integrated into the vehicle hood, a major drawback of the integrated design was the fact that, in the event of damage to the front bumper, either the entire vehicle hood would require replacement, or significant work would be involved in detaching the front bumper from the hood assembly.

The invention disclosed herein provides a front bumper that is not integrated into the vehicle hood, yet rotates out of the path of access to the vehicle engine. This rotation is accomplished either manually without the use of tools, or by linkage to the vehicle hood. In either case, when the rotating front bumper is in the non-rotated position, it bears against structural members attached to the vehicle frame rails. In this way, the impact and load bearing characteristics of the front bumper are retained.

The figures listed illustrate a vehicle with such a rotating front bumper. In the case of a rotating front bumper that is operated manually, several embodiments showing methods by which the front bumper may be restrained are shown. In the case of a rotating front bumper that is operated by means of a linkage, several four-bar type linkages are shown. A four-bar linkage is one wherein two rotating links are coupled by a third link, so that when one link rotates, it imparts motion to the second link through the third link, due to the third link being attached to the first two links at points that are tangent to their rotation. The non-movable member, in this case the vehicle chassis, provides the fourth link. This linkage may be provided in any of a multitude of arrangements, provided that they couple the rotation of the vehicle front bumper to the opening of the vehicle hood, and that the motion that is imparted is favorable to proper clearance between the front bumper and the hood during rotation.

In at least one embodiment, a sliding four-bar linkage is used. The advantage of this embodiment is that the hood is allowed to open to a certain extent prior to engaging the rotation of the front bumper. In this way, the hood remains clear of the front bumper during rotation. In another embodiment, the linkage is configured in such a way that an over-the-center type of geometry is used. An over-the-center type of four-bar linkage is one in which the distal end of one of the rotating links crosses a centerline drawn between their fixed ends. The advantage of using this type of geometry is that, upon application of a rotating force upon the front bumper, the linkage compels the hood further towards the closed position. This configuration gives greater security against the front bumper and hood articulating inadvertently, due to the fact that the force bears upon the hood seat, rather than upon the hood restraints.

The invention as presented is a solution to one of the maintenance difficulties heretofore inherent in the design of heavy-duty commercial vehicles with wrap-around front bumpers. It allows access to the vehicle engine without requiring a technician to climb over the rearwardly extending terminus of the front bumper, while retaining the aerodynamic, aesthetic, and safety advantages of the wrap-around front bumper design. Additionally, it allows the use of a non-integrated front bumper, so that in the event of damage to the front bumper, removal and replacement of the front bumper remains a simple procedure.

DETAILED DESCRIPTION

Figure 1:
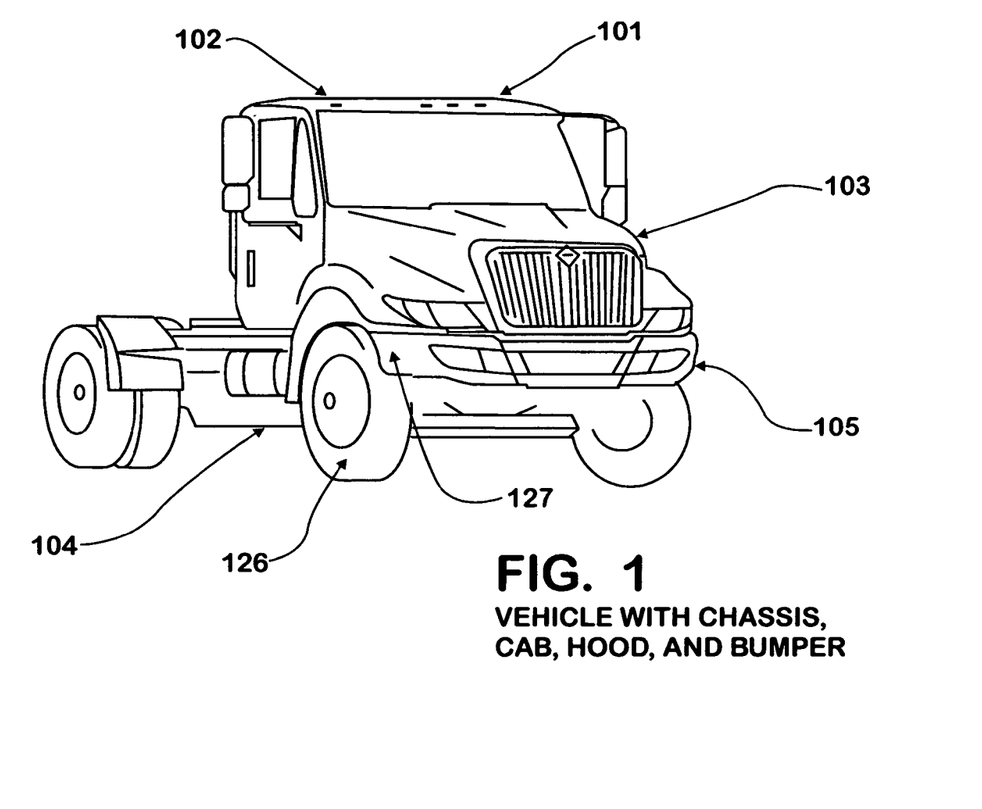
FIG. 1—A front view of a vehicle upon which the invention may be used.

The vehicle 101 shown in FIG. 1 has a cab 102 and a hood 103 engaged to a chassis 104. The vehicle 101 also has a front bumper 105 attached to the chassis 104. The chassis 104 is provided with front wheel and tire assemblies 126. Furthermore, the front bumper 105 is provided with rearwardly extending termini 127, which are proximate to the front wheel and tire assemblies 126. This is an example of the type vehicle to which this invention may be applied.

Figure 2:
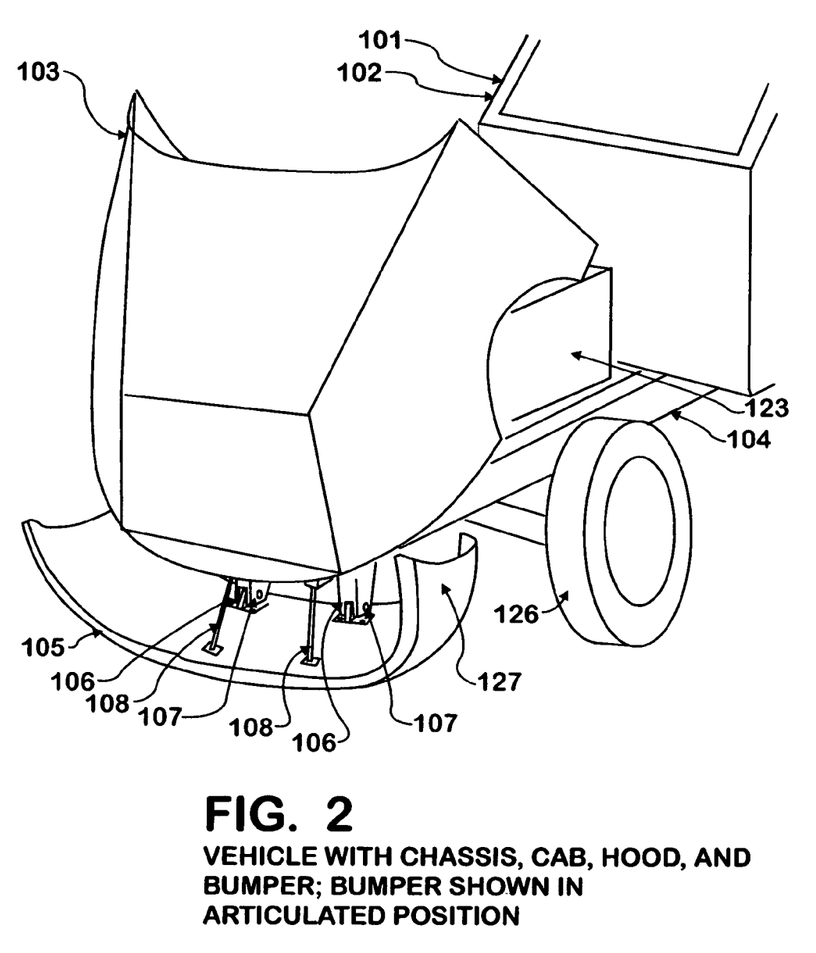
FIG. 2—A front view of a vehicle made in accordance with a first embodiment of the invention.

The vehicle 101 shown in FIG. 2 has a similar cab 102 and hood 103 attached to a chassis 104 as the vehicle 101 shown in FIG. 1. The hood 103 is shown in an open position, thereby providing access to an engine 123 installed on the chassis 104. The front bumper 105 is attached to the chassis 104 by means of the front bumper mounting brackets 106, and is shown rotated about pivot pins 107 engaged through passages in the mounting brackets 106. Rotation of front bumper 105 has caused rearwardly extending bumper termini 127 to increase in distance from front wheel and tire assemblies 126, increasing access therebetween. Restraining straps 108 engaged between the front bumper 105 and the chassis 104 prevent the front bumper 105 from over-extending and contacting the ground. The restraining straps 108 are loose until the front bumper 105 starts to unfold and become taut at the point of desired maximum rotation of the front bumper 105.

Figure 3:
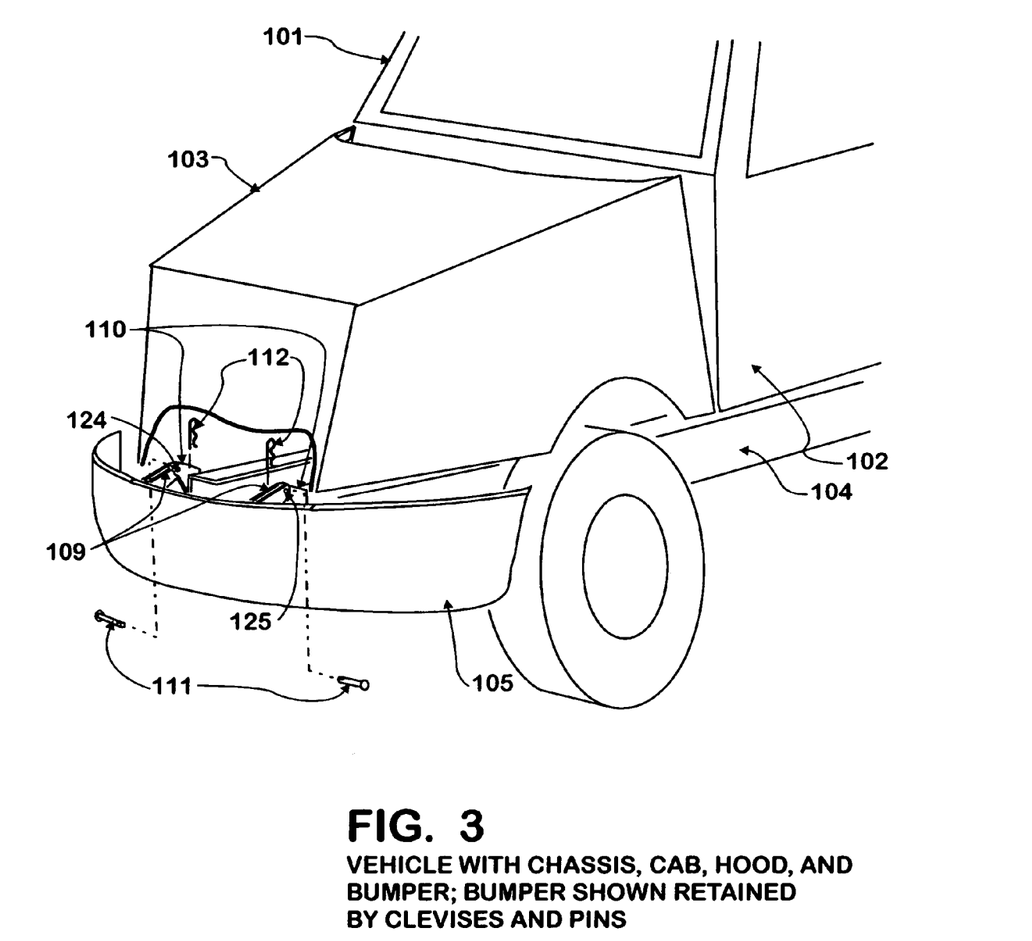
FIG. 3—A front view of a vehicle made in accordance with a second embodiment of the invention.

The vehicle 101 shown in FIG. 3 has a similar cab 102 and hood 103 attached to a chassis 104 as the vehicle 101 shown in FIG. 2. The hood 103 is shown in a closed position, and is partially removed to show additional detail. The front bumper 105 is shown in a non-rotated position, and is provided with front bumper latching brackets 109 having bumper latching bracket holes 125. The chassis 104 is provided with compatible frame latching brackets 110 having frame latching bracket holes 124. In FIG. 3, one front bumper latching bracket 109 is shown partially removed, in order to show additional detail of frame latching bracket 110 and frame latching bracket hole 124. By aligning bumper latching bracket holes 125 and frame latching bracket holes 124, and inserting latching pins 111 and attaching devises 112, the front bumper 105 may be securely retained in the non-rotated position as shown.

Figure 4:
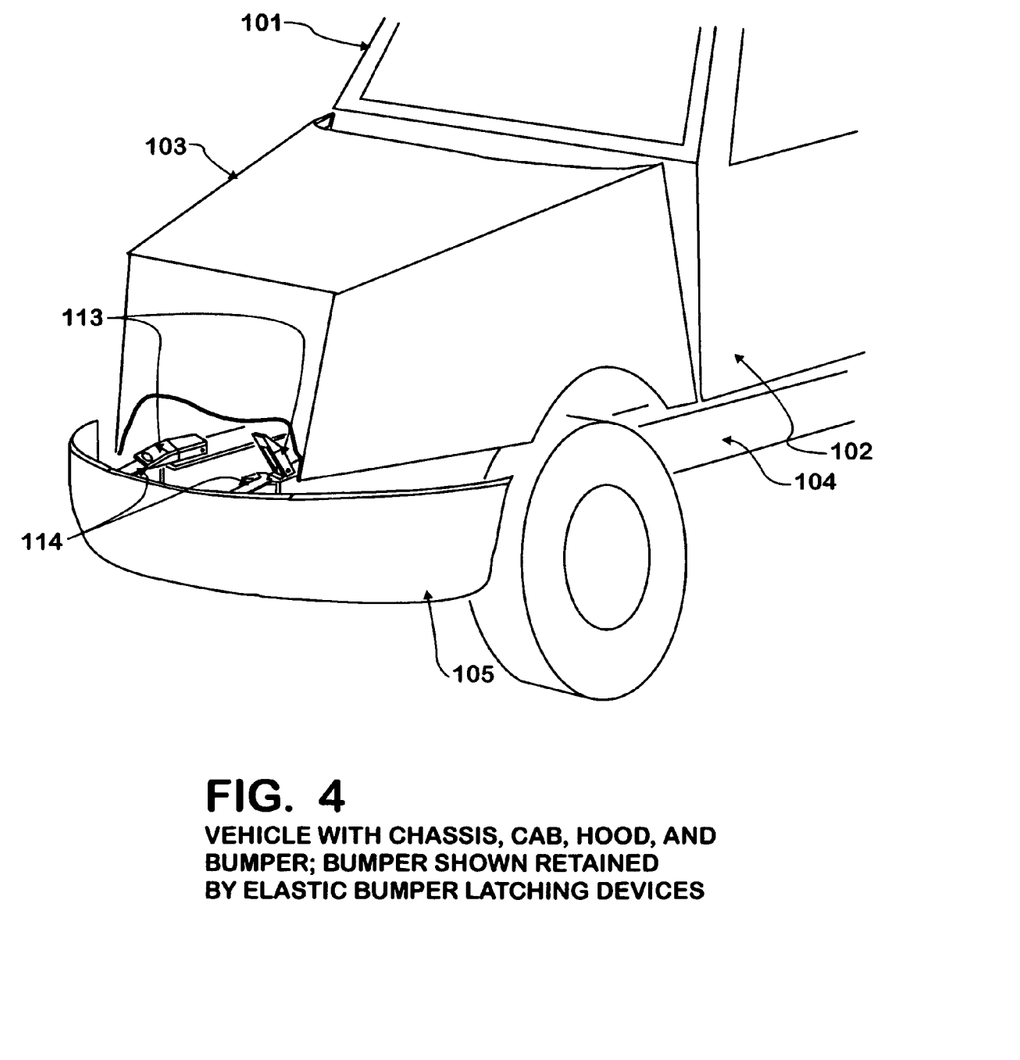
FIG. 4—A front view of a vehicle made in accordance with a third embodiment of the invention.

The vehicle 101 shown in FIG. 4 has a similar cab 102 and hood 103 attached to a chassis 104 as the vehicle 101 shown in FIG. 2. The hood 103 is shown in a closed position, and is partially removed to show additional detail. The chassis 104 is provided with elastic front bumper latch devices 113. The front bumper 105 is shown in a non-rotated position, and is provided with elastic front bumper latching receivers 114. By engaging the elastic front bumper latching devices 113 to the elastic front bumper latch receivers 114, the front bumper 105 may be securely retained in the non-rotated position as shown.

Figure 5:
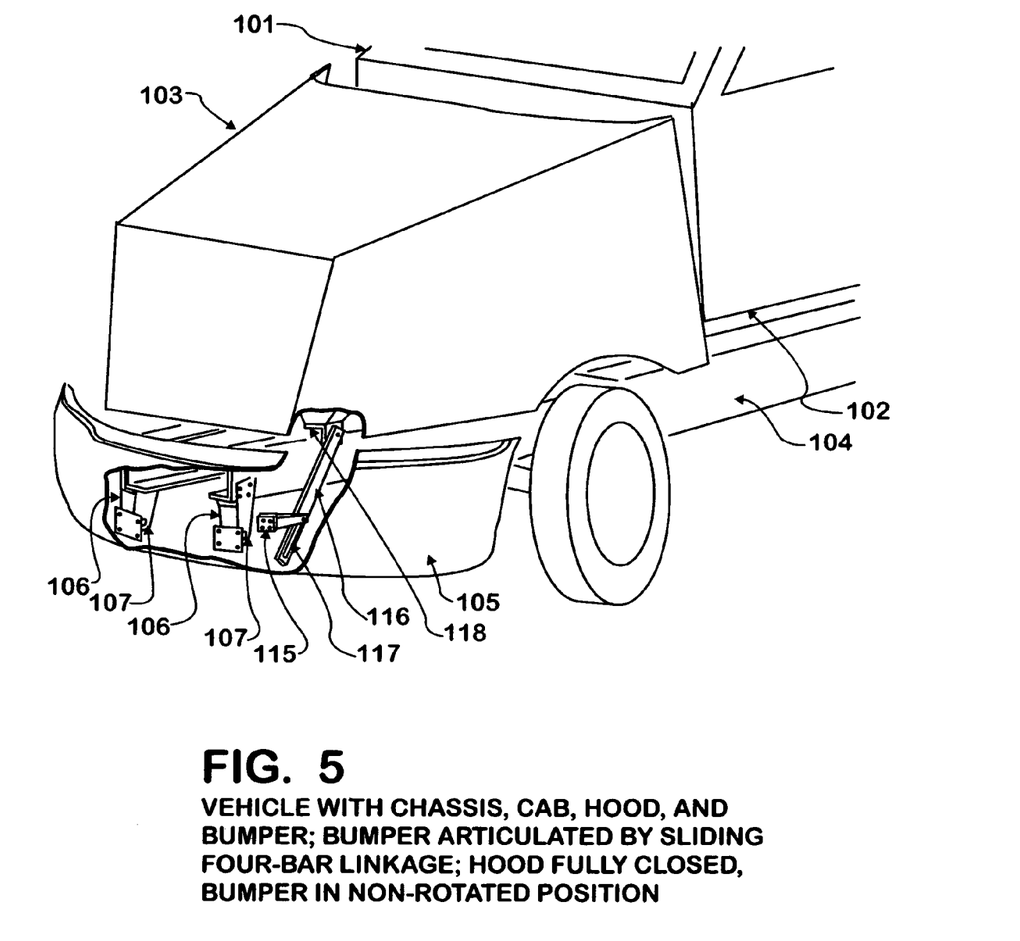
FIG. 5—A front view of a vehicle made in accordance with a fourth embodiment of the invention.

The vehicle 101 shown in FIG. 5 has a similar cab 102 and hood 103 attached to a chassis 104 as the vehicle 101 shown in FIG. 1. The front bumper 105 is attached to the chassis 104 by means of the front bumper mounting brackets 106, and may rotate about pivot pins 107 engaged through passages in the mounting brackets 106. Both the hood 103 and the front bumper 105 are shown with sections partially removed to show additional detail. Rotation of front bumper 105 is accomplished by means of a sliding four-bar type of linkage, comprised of the front bumper link 115, the sliding vertical link 116, and the hood link bracket 118. The front bumper link 115 is affixed to the front bumper 105, and the hood link bracket 118 is affixed to the hood 103. When the hood 103 is in the closed position as in FIG. 5, the front bumper link 115 is engaged to the sliding vertical link 116 at the end of sliding vertical link slot 117 most proximate to the hood link bracket 118. Because the hood 103 is retained in the closed position, the front bumper 105 may not freely rotate about pivot pins 107, and is securely retained in the non-rotated position. When the hood 103 is raised, the point of engagement of the front bumper link 115 to the sliding vertical link 116 moves to the end of the sliding vertical link slot 117 most distal from the hood link bracket 118. As the hood 103 continues to raise beyond the point where the front bumper link 115 point of engagement has reached the end of the sliding vertical link slot 117 most distal from the hood link bracket 118, sliding vertical link 116 compels front bumper link 115, and therefore front bumper 105, to rotate. In this way, clearance is maintained between the hood 103 and the front bumper 105 during articulation. In FIG. 5, the hood 103 is shown in a closed position and the front bumper 105 is shown in a non-rotated position, with the front bumper link 115 engaged to the sliding vertical link slot 117 at its end most proximate to the hood link bracket 118.

Figure 6:
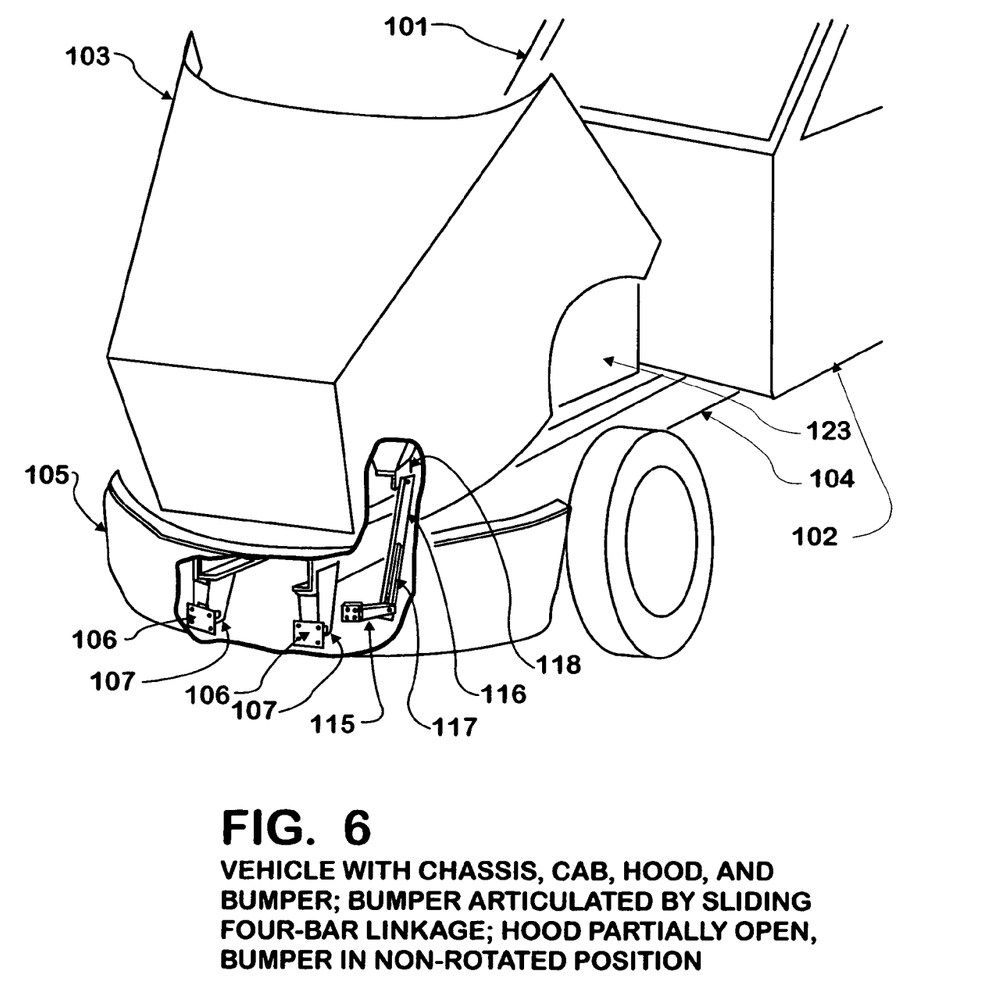
FIG. 6—A front view of a vehicle made in accordance with a fifth embodiment of the invention.

The vehicle 101 shown in FIG. 6 has a similar cab 102 and hood 103 attached to a chassis 104 as the vehicle 101 shown in FIG. 5. The front bumper 105 is again attached to the chassis 104 by means of the front bumper mounting brackets 106, and may rotate about the pivot pins 107 engaged through passages in the mounting brackets 106. Both the hood 103 and the front bumper 105 are shown with sections partially removed to show additional detail. Rotation of the front bumper 105 is again accomplished by means of a sliding four-bar type of linkage, comprised of the front bumper link 115, the sliding vertical link 116, and the hood link bracket 118. The front bumper link 115 is affixed to the front bumper 105, and the hood link bracket 118 is affixed to the hood 103. In FIG. 6, the hood 103 is shown in a partially open position, partially revealing an engine 123 installed on the chassis 104. The front bumper 105 is shown in a non-rotated position, and the front bumper link 115 is engaged to the sliding vertical link slot 117 at its end most distal from the hood link bracket 118. Further opening of hood 103 will compel front bumper link 115, and therefore front bumper 105, to rotate.

Figure 7:
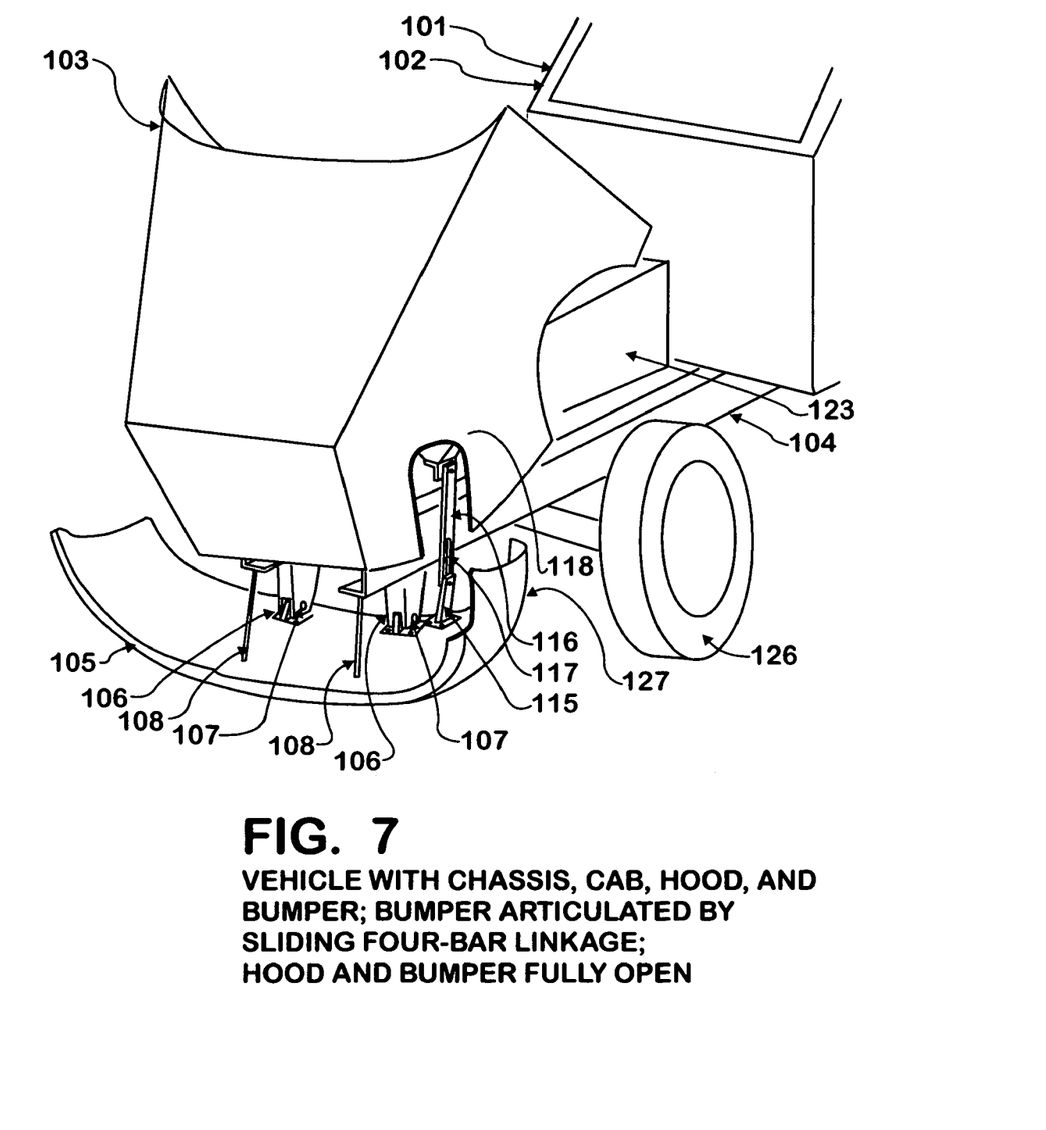
FIG. 7—A front view of a vehicle made in accordance with a sixth embodiment of the invention.

The vehicle 101 shown in FIG. 7 has a similar cab 102 and hood 103 attached to a chassis 104 as the vehicle 101 shown in FIG. 5. The front bumper 105 is again attached to the chassis 104 by means of the front bumper mounting brackets 106, and may rotate about pivot pins 107 engaged through passages in the mounting brackets 106. Both the hood 103 and the front bumper 105 are shown with sections partially removed to show additional detail. Rotation of the front bumper 105 is again accomplished by means of a sliding four-bar type of linkage, comprised of the front bumper link 115, the sliding vertical link 116, and the hood link bracket 118. The front bumper link 115 is affixed to the front bumper 105, and the hood link bracket 118 is affixed to the hood 103. In FIG. 7, the hood 103 is shown in a fully open position, thereby providing access to an engine 123 installed on the chassis 104. The front bumper 105 is shown in a rotated position, with the front bumper link 115 engaged to the sliding vertical link slot 117 at its end most distal from the hood link bracket 118. Rotation of front bumper 105 has caused rearwardly extending bumper termini 127 to increase in distance from front wheel and tire assemblies 126, increasing access therebetween. Restraining straps 108 engaged between the front bumper 105 and the chassis 104 prevent front bumper 105 from over-extending and contacting the ground. Prior to and during articulation, these restraining straps 108 are loose, and become taut at the point of desired maximum rotation of the front bumper 105.

Figure 8:
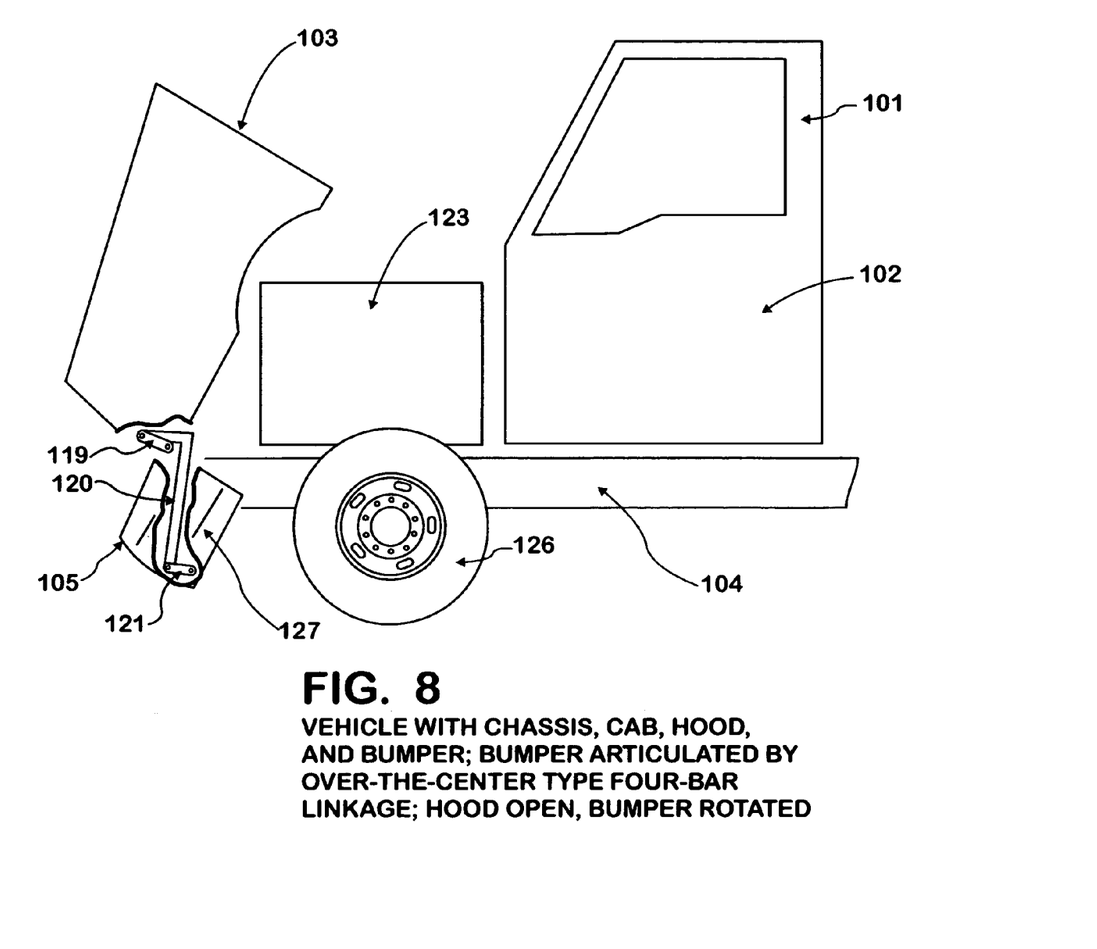
FIG. 8—A side view of a vehicle made in accordance with a seventh embodiment of the invention.

The vehicle 101 shown in FIG. 8 has a similar cab 102 and hood 103 attached to a chassis 104 as the vehicle 101 shown in FIG. 1. The hood 103 is shown in an open position, and the front bumper 105 is shown in a rotated position, thereby providing access to an engine 123 installed on the chassis 104. Rotation of front bumper 105 has caused rearwardly extending bumper termini 127 to increase in distance from front wheel and tire assemblies 126, increasing access therebetween. Both the hood 103 and the front bumper 105 are shown with sections partially removed to show additional detail. Rotation of the front bumper 105 is accomplished by means of an over-the-center type of four-bar linkage, comprised of the hood link 119, the vertical link 120, and the front bumper link 121. The hood link 119, the vertical link 120, and the front bumper link 121 are all shown in simplified form, in order to facilitate visualization of the linkage motion. The hood link 119 is affixed to and constrained to rotate with the hood 103, and the front bumper link 121 is affixed to and constrained to rotate with the front bumper 105.

Figure 9:
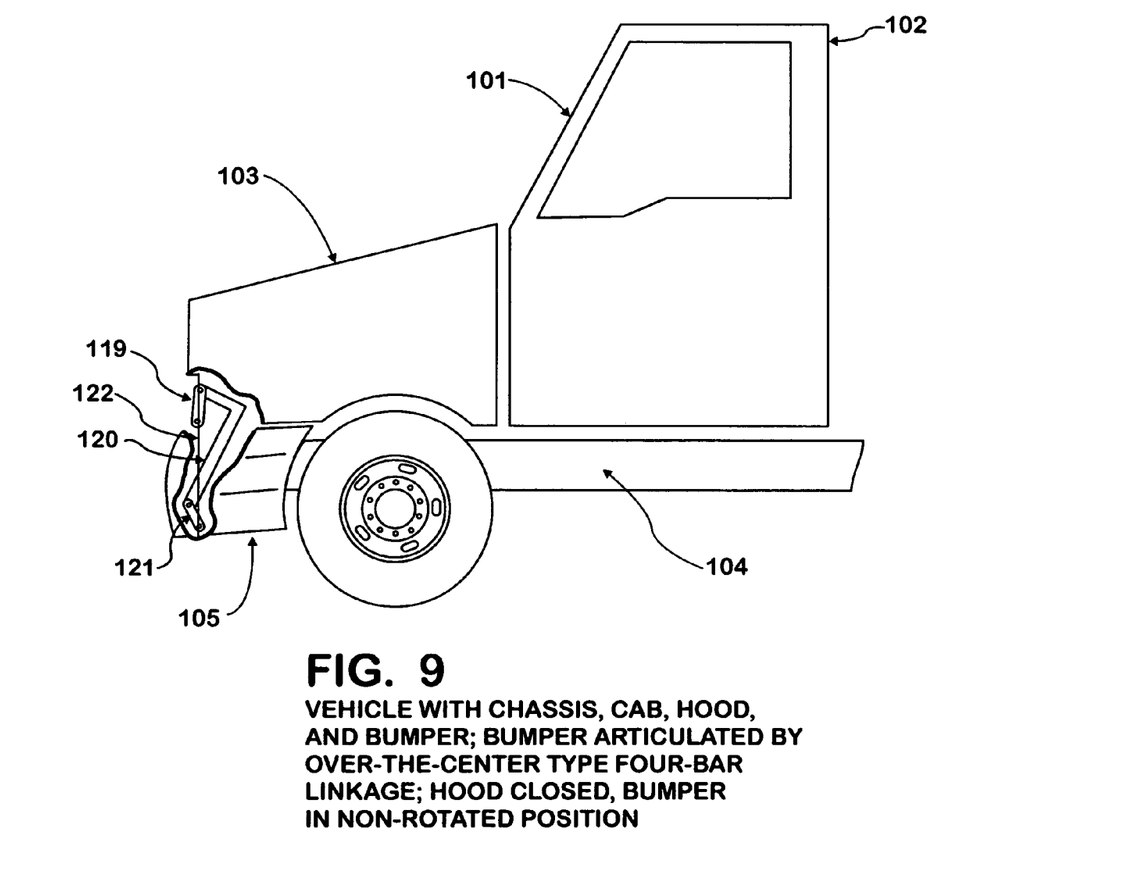
FIG. 9—A side view of a vehicle made in accordance with a eighth embodiment of the invention.

The vehicle 101 shown in FIG. 9 has a similar cab 102 and hood 103 attached to a chassis 104 as the vehicle 101 shown in FIG. 8. The hood 103 is shown in a closed position, and the front bumper 105 is shown in a non-rotated position. Both the hood 103 and the front bumper 105 are shown with sections partially removed to show additional detail. Rotation of the front bumper 105 is again accomplished by means of an over-the-center type of four-bar linkage, comprised of the hood link 119, the vertical link 120, and the front bumper link 121. The hood link 119, the vertical link 120, and the front bumper link 121 are all shown in simplified form, in order to facilitate visualization of the linkage motion. The hood link 119 is affixed to and constrained to rotate with the hood 103, and the front bumper link 121 is affixed to and constrained to rotate with the front bumper 105. Upon closure of the hood 103, the hood link 119 rotates sufficiently that its end most distal from the front bumper 105 passes over the centerline 122, with the result that, when the hood 103 is in the closed position and the front bumper 105 is in the non-rotated position as shown, the application of a rotating force upon the front bumper 105 compels the hood 103 further into the closed position. As a result, only an intentional opening of the hood 103 will result in the rotation of the front bumper 105. A rotating force upon the front bumper 105 will not result in the inadvertent opening of the hood 103.

Other permutations of the invention are possible without departing from the teachings disclosed herein, provided that the function of rotating the front bumper 105 is to allow access to an engine 123. Other advantages to a vehicle 101 equipped with a rotating front bumper 105 may also be inherent in the invention, without having been described above.

We claim:

1. A mobile vehicle for operation on the ground, comprising;
   a cab attached to a chassis;
   an engine attached to said chassis and located forward of said cab relative to said mobile vehicle forward movement;
   a hood hingedly attached to said chassis covering said engine, and providing access to said engine when in an open position;
   a front bumper rotatably attached to said chassis;
   said front bumper being rotatable by manual manipulation independent of operation of said hood;
   said front bumper being provided with detachable restraining devices, said detachable restraining devices preventing inadvertent rotation of said front bumper when attached, and allowing rotation of said front bumper when detached;
   said restraining devices further comprising elastic latching devices;
   said elastic latching devices being affixed to said chassis;
   said front bumper being provided with elastic latching device receivers; and
   said elastic devices being stretchably extendable and engagable to said elastic latching device receivers, said elastic devices retaining tension upon said elastic latching device receivers, thereby preventing inadvertent rotation of said front bumper.

2. A mobile vehicle for operation on the ground, comprising:
   a cab attached to a chassis;
   an engine attached to said chassis and located forward of said cab relative to said mobile vehicle forward movement;
   a hood hingedly attached to said chassis covering said engine, and providing access to said engine when in an open position;
   a front bumper rotatably attached to said chassis;
   said front bumper being connected to said hood by a linkage, said linkage imparting rotation to said front bumper upon operation of said hood;
   said linkage further comprising a plurality of links; and
   said plurality of links being provided with a hood link being constrained to rotate with said hood, a front bumper link being constrained to rotate with said front bumper, and a vertical link connecting said hood link and said front bumper link.

3. The vehicle of claim 2, wherein:
   said vertical link further comprises a sliding link member, said sliding link member allowing said hood to operate over part of its range of motion prior to imparting motion to said front bumper.

4. The vehicle of claim 2, wherein:
   said plurality of links further comprises an over-the-center type of linkage;
   said over-the-center linkage causing rotation of said bumper upon opening of said hood; and
   said over-the-center linkage preventing inadvertent opening of said hood upon application of a rotating force upon said bumper.

5. A mobile vehicle for operation on the ground comprising:
   a cab attached to a chassis, said chassis being provided with front wheel and tire assemblies;
   an engine attached to said chassis and located forward of said cab relative to said mobile vehicle forward movement;
   a hood hingedly attached to said chassis covering said engine, and providing access to said engine when in an open position;
   a front bumper rotatably attached to said chassis, said front bumper having rearwardly extending termini proximate to said front wheel and tire assemblies when in a non-rotated position, and distant from said front wheel and tire assemblies when in a rotated position;
   said front bumper being rotatable by manual manipulation independent of operation of said hood;

said front bumper being provided with detachable restraining devices, said detachable restraining devices preventing inadvertent rotation of said front bumper when attached, and allowing rotation of said front bumper when detached;
said restraining devices further comprising elastic lathing devices;
said elastic latching devices being affixed to said chassis;
said front bumper being provided with elastic latching device receivers; and
said elastic devices being stretchably extendable and engagable to said elastic latching device receivers, said elastic devices retaining tension upon said elastic latching device receivers, thereby preventing inadvertent rotation of said front bumper.

6. A mobile vehicle for operation on the ground, comprising:
a cab attached to a chassis, said chassis being provided with front wheel and tire assemblies;
an engine attached to said chassis and located forward of said cab relative to said mobile vehicle forward movement;
a hood hingedly attached to said chassis covering said engine, and providing access to said engine when in an open position;
a front bumper rotatably attached to said chassis, said front bumper having rearwardly extending termini proximate to said front wheel and tire assemblies when in a non-rotated position, and distant from said front wheel and tire assemblies when in a rotated position;
said front bumper being connected to said hood by a linkage said linkage imparting rotation to said front bumper upon operation of said hood;
said linkage further comprising a plurality of links;
said plurality of links being provided with a hood link being constrained to rotate with said hood, a front bumper link being constrained to rotate with said front bumper, and a vertical link connecting said hood link and said front bumper link.

7. The vehicle of claim 6, wherein:
said vertical link further comprises a sliding link member, said sliding link member allowing said hood to operate over part of its range of motion prior to imparting motion to said front bumper.

8. The vehicle of claim 6, wherein:
said plurality of links further comprises an over-the-center type of linkage;
said aver-the-center linkage causing rotation of said bumper upon opening of said hood; and
said over-the-center linkage preventing inadvertent opening of said hood upon application of a rotating force upon said bumper.

* * * * *